June 4, 1935.  O. W. LEE  2,003,806
OPTICAL APPLIANCE
Filed June 19, 1933  3 Sheets-Sheet 1
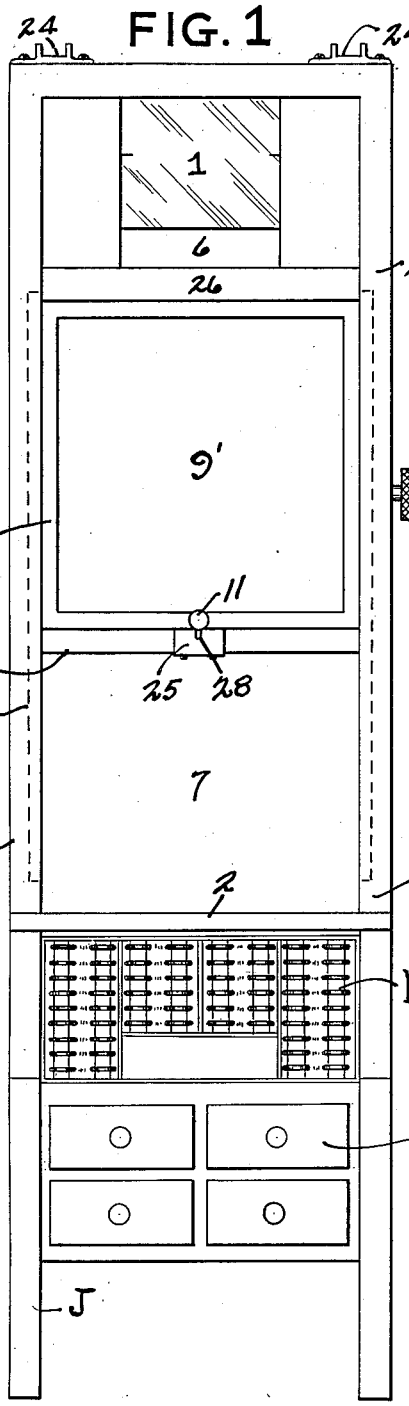
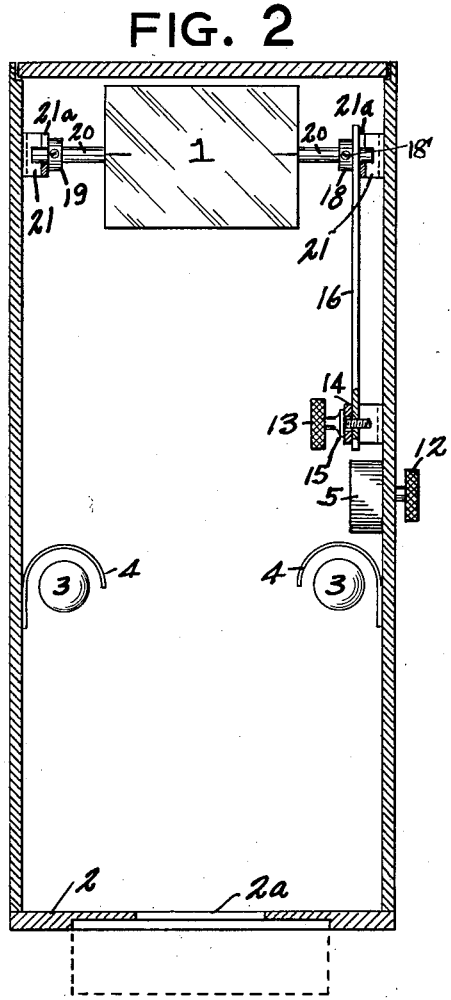
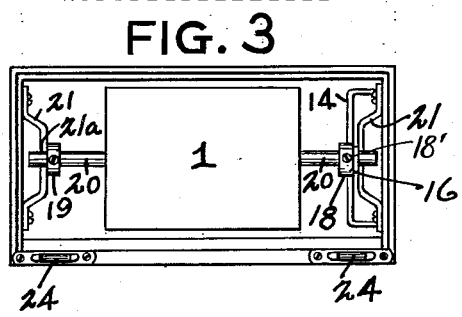
Orval W. Lee
INVENTOR
BY Herbert E. Drueth
ATTORNEY June 4, 1935.    O. W. LEE    2,003,806
OPTICAL APPLIANCE
Filed June 19, 1933    3 Sheets-Sheet 2
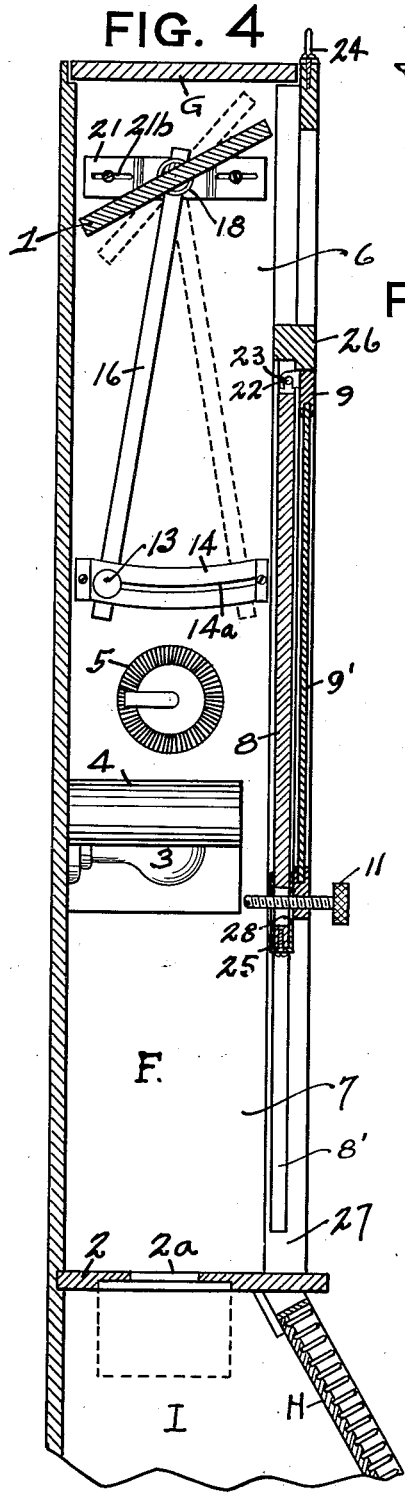
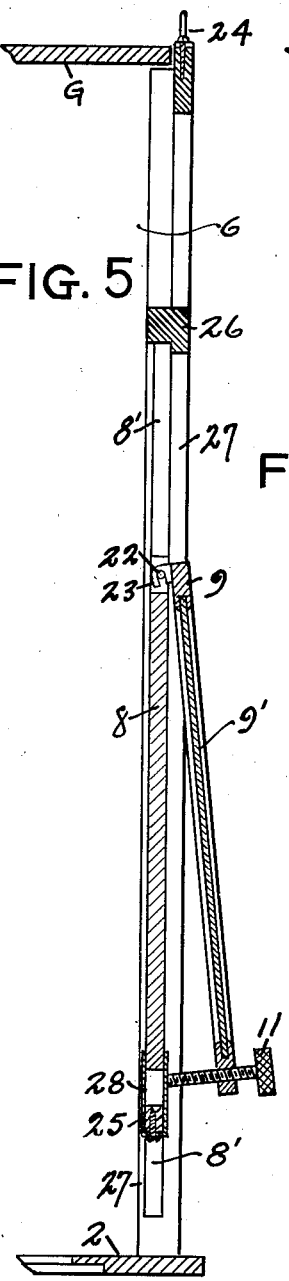
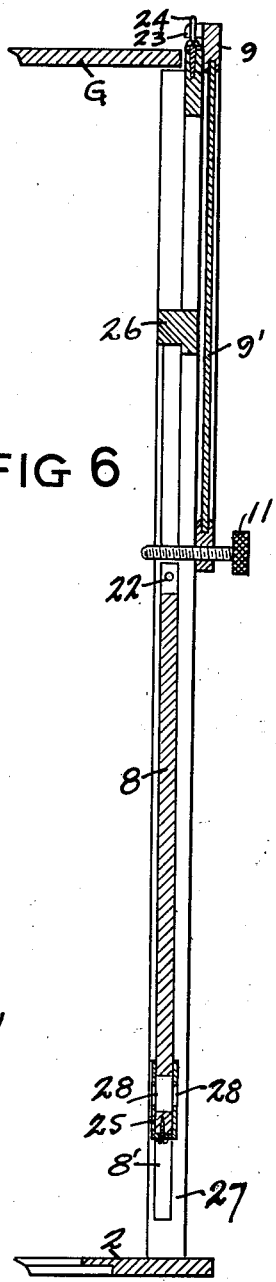
Orval W. Lee
INVENTOR
BY Herbert E. Smith
ATTORNEY June 4, 1935.  O. W. LEE  2,003,806
OPTICAL APPLIANCE
Filed June 19, 1933   3 Sheets-Sheet 3
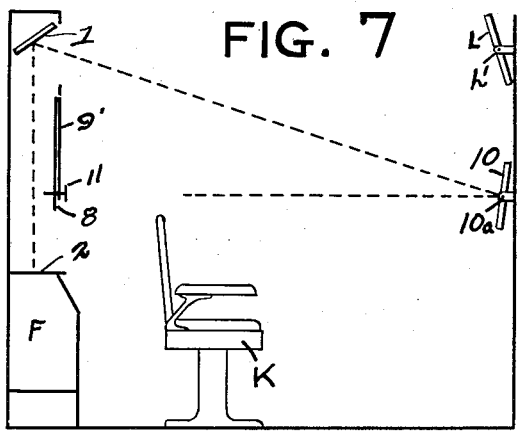
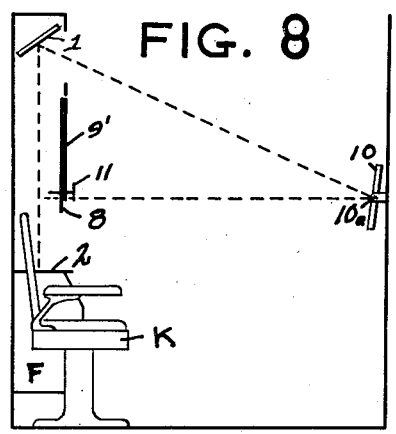
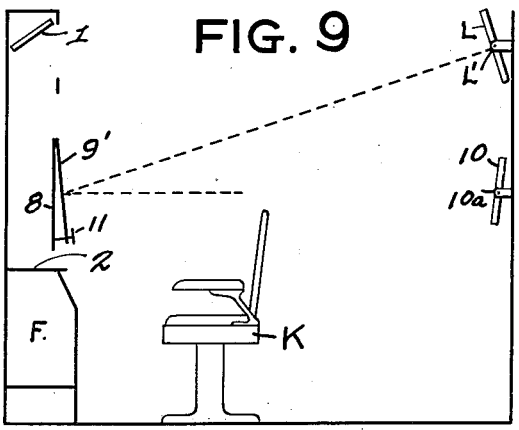
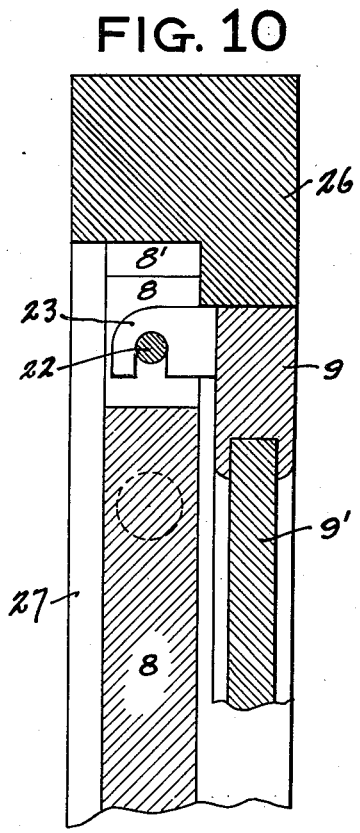
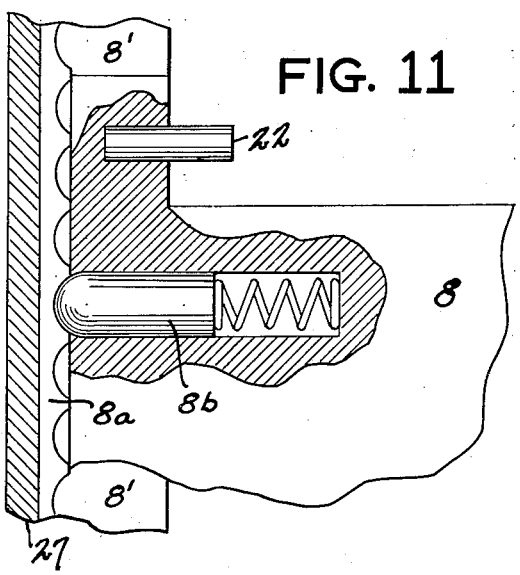
Orval W. Lee
INVENTOR
BY Herbert E. Smith
ATTORNEY Patented June 4, 1935

2,003,806

UNITED STATES PATENT OFFICE 2,003,806

OPTICAL APPLIANCE

Orval W. Lee, Spokane, Wash.

Application June 19, 1933, Serial No. 676,454

17 Claims. (Cl. 88—20)

My present invention relates to an improved optical appliance comprising an ophthalmic deflector of the multiple reflecting type for use by oculists and optometrists for measuring the vision of the eye and for various purposes involving optical principles of light, vision, and ocular function. In carrying out my invention I provide an optical appliance that is compact in its arrangement whereby a minimum space in a laboratory, office, or other place is required for eye examinations, and this compactness is attained by the combination, arrangement, and use of a number of adjustable reflecting surfaces or mirrors and the test-object holder to provide the required observation distance, and a number of observation distances are provided by different modes of using the appliance.

Means are provided for adjusting the reflecting surfaces or mirrors to alter the angle of incidence and the angle of reflection with relation to the mirror, and the combination and arrangement of the parts of the invention permit of required variations in the position and height of the person whose eyes are being examined. In the eye examination, the person being examined observes the test-objects indirectly, through the use of the reflecting surfaces or mirrors and the test-object employed in the examination is at all times out of sight, or removed from the vision of the person being examined; except when the reflected image is observed in the observation mirror.

Due to the simplicity in construction and operation of the various parts of the appliance, the mirrors may with facility be adjusted to the required angles and the appliance may quickly and conveniently be regulated with accuracy and be made ready for immediate use.

Variations may also readily be made in the arrangement and use of the various reflecting surfaces or mirrors for adapting the appliance to different modes of use in examining the eyes.

By the utilization of the appliance of my invention I produce a non-reversed, vertically arranged, reflected image from a horizontally disposed test-object, and the arrangement of the first reflecting mirror vertically above the test-object permits a substantial portion of the observation distance to be gained in the space above the test-object, which materially reduces valuable space that would otherwise be required to secure the proper observation distance.

The parts of the appliance are so co-ordinated as to perform their functions with invariable accuracy at all times and under all conditions, and any skilled person can operate the appliance without difficulty.

The test-object holder is adaptable to various instruments, devices and test-objects of the examiner's own choosing.

The invention consists in certain novel combinations and arrangements of parts as will hereinafter be more fully set forth and claimed. In the accompanying drawings I have illustrated one complete example, and exemplified several uses, of the physical embodiment of my invention, but it will be understood that various changes and alterations may be made in the exemplified structure without departing from the principles of the invention.

Figure 1 is a front elevation of a cabinet forming part of the equipment of the optical appliance involving the principles of my invention, with the detachable mirror shown in elevated position. Figure 2 is a vertical sectional view of the cabinet illustrating the horizontally arranged observation area or test-object holder at the bottom of the cabinet and the main reflecting mirror at the top, illustrating that a portion of the observation distance is attained vertically between them. Figure 3 is a top plan view of the manner of mounting the main mirror, with the top of the cabinet removed.

Figure 4 is a vertical, transverse, sectional view of the cabinet disclosing the main mirror and its operating parts, and with the detachable mirror in positon of Figure 1.

Figure 5 is a vertical, sectional view of the front frame with the detachable miror in adjusted position for use.

Figure 6 is a similar view with the detachable miror suspended at the top of the cabinet and the vertically movable panel in adjusted position for use as an observation area or test-object holder.

Figures 7, 8, and 9 are diagrammatic views illustrating the method of employing the appliance, with the patient's chair in different positions.

Figure 10 is a detail, enlarged view, showing the relation of the vertically movable panel and the detachable mirror.

Figure 11 is a detail, enlarged view, partly in section, of the vertically movable panel and the means for holding it in adjusted position.

In carrying out my invention, as part of the equipment, I may employ a cabinet F, and for convenience of the examiner, the lower portion of the cabinet may be provided with a removable tray H to hold test lenses, a compartment for a test-object device I, and drawers M, the whole being supported above the floor on legs J. The chair to be occupied by the person undergoing the eye examination is indicated as K, and as indicated, for instance in Figures 7 and 9, the chair may be faced in opposite positions with relation to the cabinet, to provide different observation distances, or, as indicated in Figure 8, the chair K may be placed beside the cabinet F.

In the uppermost part of the cabinet, just below the removable top G, a reflecting surface or mirror 1 is supported on its horizontal shaft or axis 20, and this mirror is located directly over the test-object holder or table 2 that is fashioned as a horizontal partition in the cabinet, and designed to provide a horizontal plane or observation area on which the letters, numbers, or other test-objects are used. As indicated in Figure 4, the horizontal partition has a centrally located rectangular aperture 2a and is recessed on its lower surface to provide for attachment of a test-object device below the table, thereby providing means to alternately employ different test-objects immediately above and immediately below this horizontal plane. The test-object within the cabinet is illuminated by the use of a pair of lamps indicated at 3, 3, which are supported from opposite walls of the cabinet and provided with shade-reflectors 4, 4 and the illumination from these lamps is controlled at 5, through the manipulation of a knob 12 located exterior of the cabinet and readily accessible to the examiner.

The front of the cabinet is provided with a frame including an upper cross bar 26 and upright side guide rails 27, and this frame forms two apertures or openings as 6 and 7. The upper, rectangular opening 6, is located in front of the main mirror 1 to provide for transmission of light rays, and the lower aperture 7, bounded at its sides by the side rails 27, provides access to the test-object holder and also space for a vertically movable panel 8. This panel is vertically adjustable in the grooves 8' of the side rails 27, and it may be retained in vertically adjusted position by any appropriate means, as indicated, for instance, in Figure 11, with the racks 8a in the grooved rails and in cooperation with the spring-pressed detents 8b mounted on opposite sides of the panel.

The adjustable panel is designed for use as a test-object holder, and as a support or holder for detachable frame 9 which is provided with a mirror or reflecting surface 9', and this mirror, of course, is raised or lowered with the panel on which it is supported. As best seen in Figures 10 and 11, the panel 8 is provided with a pair of inwardly extending, short, hinge pins 22, one at each of its upper corners, and the frame of the reflecting mirror is provided with a pair of complementary, open, bearing lugs or hooks 23 which fit over these pins. Thus the mirror is not only adjustable vertically with its supporting panel, but the mirror may be swung on its pivot pins to various angles with relation to the panel, as indicated in Figure 5. When not in use, the mirror 9' may readily be detached from the pins 22, and suspended from the top edge of the front frame, as indicated in Figure 6, and secured in this position by the U-shaped hangers 24 indicated in Figure 1.

In combination with the adjustable mirror 1, I employ a spaced, incidental reflecting surface or mirror 10, which is pivotally mounted on its horizontal axis at 10a on a suitable support, and spaced some distance in front of the cabinet F. To accommodate persons of different heights, this incidental mirror may be located at different heights and the planes of the two mirrors may be adjusted in relation one to another by turning the mirrors on their horizontal axes.

In combination with the detachable mirror 9' I employ a spaced observation area or test-object holder L, which is pivotally mounted on its horizontal supporting axis at L' on a suitable support and spaced some distance in front of the cabinet F and some distance above the height of the observer. To accommodate persons of different heights, this test-object holder may be adjusted on its horizontal supporting axis to position so that its image in the adjusted detachable mirror 9' will appear perpendicular to the line of vision of the observer.

The detachable mirror 9' and its frame 9 may readily be adjusted in their angular relation to the supporting panel 8 by means of a set screw 11 that is threaded through the lower part of the frame and is of sufficient length for the required purpose of adjusting the mirror. A clip 25, U-shaped in cross section, is slidably mounted on the lowermost part of the panel 8 and provided with a slot 28 in its walls through which the screw 11 may pass, or this clip may provide a base plate against which the end of the screw impinges. The bottom bar of the panel is also provided with a transverse hole at its central portion with which the slot 28 may register and when the clip is in central position on the panel, the screw may pass through the hole and slot permitting the mirror to hang in vertical position as indicated in Figure 4. By sliding the clip to right or left in Figure 1 to remove the slot 28 from alinement with the screw 11, the clip is then in position to form a base for impingement of the end of the screw. In this position the screw may be turned to accurately adjust the angularity of the mirror 9' and its frame 9, as indicated in Figure 5.

The main reflecting mirror 1 is retained in its adjusted position by means of a set screw 13, as best seen in Figures 2 and 4, which screw passes through the slot in a slotted, arcuate, guide plate 14 which is fastened to the inner side of one of the side walls of the cabinet, below the mirror 1.

A friction shoulder 15 is mounted on the screw 13 and the arcuate guide occupies a position between this shoulder and the lower end of adjusting arm 16 that is threaded to receive screw 13, and as adjusting arm 16 has as its pivotal axis the shaft 20 of the mirror 1, it will be apparent that the screw 13 may be employed to clamp the adjusting arm on the slotted guide plate to hold the mirror in its adjusted position.

The upper end of the arm 16 is provided with a hole to fit over the shaft 20 and is attached to a collar 18 mounted on the shaft 20 to form a coupling between the arm, the collar and the shaft, in order that these parts will co-act in the adjustment of the mirror 1 as the arm 16 is swung to desired position.

A set screw 18' serves to fix the collar 18 to the shaft 20 which is fixed to the mirror 1 and it will be plain that the angular relation between the adjusting arm 16 and mirror 1 may be altered to cover a selected range so that the center of the guide plate 14 will indicate the mean and thereby permit of the extreme adjustment in both directions. Different hydraulic chairs have different ranges of adjustment and it is a simple matter to adjust a given hydraulic chair to its mean height, then position the adjusting arm 16 at the center of the guide plate 14 and employ the set screw 18' to fix the mirror 1 at the required angle for this mean position so as to provide for extreme adjustment in both directions by means of the arm 16 and set screw 13 co-acting with the guide plate 14, for instances of use which are beyond the range of adjustment of the chair K and require the incidental mirror 10 to be placed at different heights.

At the opposite end of the shaft 20 a second collar 19 is mounted, the two collars retaining the shaft and mirror in position laterally, and the shaft is journalled in bearing brackets 21 attached to the faces of the opposite side walls of the cabinet. These bearing plates or shaft supports are provided with bearing notches as 21a for the journal ends of the shaft 20, and it will be apparent that these parts, as well as the connection of the arm 16 to the shaft, are fitted in such manner that the mirror equipment may readily be assembled in operative position, or it may be dismantled with equal facility when required for any reason.

As disclosed in the drawings, a portion of the observation distance is attained within the appliance, i. e., the vertical distance between the test-object holder or horizontal partition 2 and the reflecting mirror 1, this distance may be governed by the height of the appliance, and in this manner a material decrease is accomplished in the floor space required for any desired observation distance. The main reflecting mirror 1 is located at the uppermost portion of the appliance, and an unobstructed central portion of the vertical space is available for reflecting the image of the test-object, in the manner indicated by dotted lines in Figure 7. In this figure of the drawings the patient occupies the chair K with his back to the appliance F and his eye-level on a line with the center of the observation mirror 10. The detachable mirror 9' is in its uppermost position, and is not used in this particular instance.

In Figure 9 the patient faces the appliance F and looks into the vertically adjusted and angularly adjusted mirror 9' that is now used as the observation mirror to obtain a reversed image of the observation area L located behind the observer, as indicated by the dotted lines. In this position of arrangement the mirror 9' may be removed and the vertically adjusted panel 8 used as an observation area or test-object holder at the close proximity then existing.

In Figure 8 the patient's chair K is shown at one side of the appliance F and the transmission of light rays and reflection of the image of the test-object is indicated by the dotted lines, as the patient faces the incidental mirror 10. In this position the mirror 9' serves only for ornament and the vertically movable panel 8 serves to gain access to the adjustment feature of mirror 1.

As an example of the operation of the appliance according to Figure 7, the appliance, the observer, and the mirror 10 are situated in a straight line and at any desired distance apart, with the observer or patient occupying an intermediate position and facing away from the appliance and towards the mirror 10, and with sufficient distance between the chair K and the cabinet F for the examiner to stand. The observations are made by observing the reflected image seen in mirror 10, which is located with its horizontal median at the same height as the eye level of the observer. Mirror 10 is adjusted or angled on its horizontal axis to position to cause the image of the horizontal axis of the mirror 1 to coincide with the horizontal axis of mirror 10. The mirror 1 is also adjusted on its horizontal axis to cause the image of the parallel median of the test-object holder of the horizontal plane 2 to coincide with the image of the horizontal axis of the reflecting mirror 1 and the already coinciding horizontal axis of mirror 10, each of the three surfaces being suitably marked to facilitate registering coincidence. The observer will then see the horizontal axis of mirror 10, the horizontal axis of the mirror 1 and the parallel median of the test-object holder of the horizontal plane 2, all in a straight line and on a level with the eye of the observer. The perpendicular to the horizontal plane 2 now appears horizontal to the observer and the horizontal plane 2 appears vertical. The image of the test-object on the horizontal plane 2 appears vertical in mirror 10, and free from the distortion otherwise caused by inclination of the image when the plane of the image is not perpendicular to the line of vision of the observer. The image in mirror 10 is a reverse image of the reversed image in mirror 1, consequently, the image of the test-object on the horizontal plane 2 will not appear reversed as to left and right in mirror 10.

In Figure 9 where the detachable mirror 9' is employed, the observer occupies the chair K and faces the appliance F. The vertically movable panel 8 is lowered to a height which will cause the horizontal median of the mirror 9' to be at the same height as the eye level of the observer. Then the mirror 9' is adjusted by means of the screw 11 co-acting with clip 25 to cause the horizontal median of the observation area or test-object holder L behind and above the patient to coincide with the horizontal median of the mirror 9'. This observation area or test-object holder is angled or adjusted on its horizontal supporting axis to a position to cause its reversed image in the mirror 9' to appear perpendicular to the line of vision of the observer, and this observation area may then be used as a test-object holder and utilized to conduct any desired ophthalmic procedure. The detachable mirror 9' may be removed and the adjusted panel 8 may be employed for the purpose of a vertical observation area or test-object holder, by direct observation at the close proximity then existing.

The mirror 1 as indicated in Figure 4 may readily be adjusted to proper position within the upper end of the cabinet through the use of slots 21b in the brackets 21, and after the slotted brackets are properly adjusted they are rigidly attached to the side walls of the cabinet. Through the use of the bearing slots 21a in the brackets for the shaft 20, and after the lower end of arm 16 has been released from the arcuate guide plate, the mirror and its parts may be removed as a unit, through the opened upper end of the cabinet, if and when required for any reason.

The range of adjustment of the mirror 1 is indicated by the full line position and the dotted line position of the arm 16 in Figure 4, the center point of the arcuate guide plate 14, of course, indicating the mean position within the range of adjustment. The adjustment may quickly be attained, when the screw 13 is loosened, by swinging the arm 16 to desired position. For this purpose the vertically movable panel 8 and mirror 9' are placed at lowermost position. The angle of the mirror 1 may be set or reset to cover any range or change of range. For this purpose the adjusting arm 16 and attached collar 18 on the shaft 20 are reset with relation to their attachment on shaft 20 that turns with mirror 1.

Having thus fully described my invention, what I claim as new and desire to secure by Letters Patent is:—

1. Apparatus for optical use comprising a horizontal test-object holder, a primary reflector spaced thereabove and a secondary reflector spaced forwardly therefrom, the light rays perpendicular to the median of said test-object holder being incident to the horizontal median of said primary reflector; the horizontal median of said primary reflector, secondary reflector and test-object holder each being marked, said primary reflector and said secondary reflector being disposed in the angular relation required to cause the image of said marked median of the test-object holder and the image of said marked median of the primary reflector to lie in a horizontal plane intersecting said marked median of the secondary reflector, thereby to indicate the proper eyelevel of the observer and to insure a precisely vertical image of said horizontal test-object holder.

2. Apparatus for optical use comprising a horizontal test-object holder, a primary reflector spaced thereabove and a secondary reflector spaced forwardly therefrom, the light rays perpendicular to the median of said test-object holder being incident to the horizontal median of said primary reflector; said secondary reflector and said primary reflector being disposed in the angular relation required to cause the image of said horizontal median of the test-object holder and the image of said horizontal median of the primary reflector to lie in a horizontal plane intersecting the horizontal median of said secondary reflector, whereby the image of said horizontal test-object holder is seen precisely vertical and free from inclination distortion.

3. Apparatus for optical use comprising a secondary reflector situated with its horizontal median at the eyelevel of an observer, a primary reflector situated rearwardly of said observer and with the horizontal median thereof considerably above said eyelevel of the observer, a horizontal test-object holder disposed considerably below said eyelevel of the observer and in that position where the light rays perpendicular to the median of said test-object holder are incident to said median of the primary reflector, a mark indicating each of said medians; said primary reflector and said secondary reflector being disposed in the angular relation required to cause all of said indicating marks to appear to lie in the same horizontal plane and at the eyelevel of the observer.

4. Apparatus for optical use comprising a secondary reflector situated with its horizontal median at the eyelevel of an observer, a primary reflector situated rearwardly of said observer and with the horizontal median thereof considerably above said eyelevel of the observer, a horizontal test-object holder disposed considerably below said eyelevel of the observer and in that position where the light rays perpendicular to the median of said test-object holder are incident to said median of the primary reflector; said secondary reflector and said primary reflector being disposed in the angular relation required to deflect said perpendicular light rays to intersect their original course at precisely right angles.

5. A cabinet for optical use, having a horizontal test-object holder therein; a primary reflector in the upper part of said cabinet, the light rays perpendicular to the median of said test-object holder being incident to the horizontal median of said primary reflector; a secondary reflector, means for adjusting said primary reflector upon its horizontal median to reflect said perpendicular rays downward and forward to said secondary reflector situated at a predetermined point and adjustable on its horizontal median; an opening in the front of said cabinet for the path of light; a second opening in the front of said cabinet to afford access to said test-object holder; and means for coordinating the angular adjustment of both the aforesaid reflectors, to assure a precisely vertical image of said horizontal holder, irrespective of the various heights at which either of said reflectors may be situated.

6. Apparatus for optical use, comprising a secondary reflector pivoted on its horizontal median and situated at the eyelevel of an observer; a primary reflector situated rearwardly of said observer and considerably above the eyelevel thereof, said primary reflector being pivoted on its horizontal median; a horizontal test-object holder disposed considerably below the eyelevel of said observer, with the horizontal median of said test-object holder parallel with the horizontal median of said primary reflector; means for horizontally adjusting said primary reflector to that position where the light rays perpendicular to said median of the test-object holder will be incident to said horizontal median of the primary reflector; means for angularly adjusting said primary reflector on its horizontal median to deflect said perpendicular rays to the horizontal median of said secondary reflector; means for adjusting said secondary reflector on its horizontal median to deflect said rays precisely horizontal, whereby the image of said horizontal holder will be accurately centered in the primary reflector and in the secondary reflector and will be seen by said observer as precisely vertical and at eye level.

7. Apparatus for optical use, comprising a secondary reflector pivoted on its horizontal median and situated at the eyelevel of an observer; a primary reflector situated rearwardly of said observer and considerably above the eyelevel thereof, said primary reflector being pivoted on its horizontal median; a horizontal test-object holder disposed considerably below the eyelevel of said observer, with the horizontal median of said test-object holder parallel with the horizontal median of said primary reflector; means for horizontally adjusting said primary reflector to that position where the light rays perpendicular to said median of the test-object holder will be incident to said horizontal median of the primary reflector; means for angularly adjusting said primary reflector on its horizontal median to deflect said perpendicular rays to the horizontal median of said secondary reflector; means for adjusting said secondary reflector on its horizontal median to deflect said rays precisely horizontal, whereby the image of an object on said horizontal holder will be accurately centered in the primary reflector and in the secondary reflector and will be seen by said observer as precisely vertical and at eye level; an indicator marking the aforesaid median of each of the three surfaces, whereby proper adjustment of the primary reflector and secondary reflector may be readily ascertained by observing the coincidence of the three indicators as seen in and on the secondary reflector when both reflectors are properly adjusted.

8. In an optical appliance, the combination with a pair of brackets, of a shaft removably journaled in open journal slots in said brackets, a mirror rigid with said shaft, a pendent arm rigid with said shaft, an arcuate guide plate for the free end of said pendent arm, means for securing the pendent arm in adjusted position relative to said arcuate guide plate and means for adjusting said brackets for transverse adjustment of said shaft and the mirror rigid therewith.

9. In an appliance for ophthalmic use, the combination of a mirror supported on the horizontal median of its reflecting surface, means for alternately supporting numerous test-media on a horizontal plane at a substantial distance below said mirror and with the median of the test-media parallel to the horizontal supporting median of the reflecting surface, an incidental mirror, means for adjusting the angle of said reflecting surface whereby the light rays, perpendicular to the median of the test-media are deflected to the horizontal median of said incidental mirror, said incidental mirror being supported on its horizontal median at a suitable height in front of the appliance, and means to adjust the angle of the incidental mirror, whereby the light rays perpendicular to the median of the horizontal test-media are reflected precisely horizontal to intersect their original course at precisely a right angle, whereby the image of the horizontal test-media will be precisely vertical and free from the distortion otherwise due to inclination of the image.

10. In an appliance for ophthalmic use means for interchangeably supporting numerous test-media on a horizontal plane, means for illuminating said test-media, a mirror spaced at a substantial distance vertically above the test-media and centered therewith, an incidental mirror spaced at a substantial distance horizontally in front of the appliance, and said mirrors having an angular relation one to the other, whereby the path of light will intersect itself at precisely right angles when finally reflected precisely horizontal; and whereby a substantial portion of the observation distance is gained within the appliance.

11. The combination with a cabinet for optical use and having a pair of spaced U-shaped retaining brackets on the top of said cabinet, of a vertically movable panel mounted on the cabinet, a pair of spaced hinge-pins on the upper part of the panel, a mirror, a pair of complementary hinge-hooks on the mirror frame for alternative use with the U-shaped retaining brackets and the hinge pins, and co-acting means on the mirror frame and panel for adjusting the former when hinged on the latter.

12. The combination with a cabinet for optical use and a vertically movable panel mounted on the cabinet, of a slidable perforated clip on the lower part of the panel, a mirror hinged to the upper part of said panel, and an adjusting screw threaded in the lower part of the mirror for impingement against the slidable clip.

13. The combination with a cabinet for optical use, of a vertically movable panel, means for retaining the panel in vertically adjusted position, a mirror supported on said panel and means for adjusting said mirror, of a laterally spaced vertical test-object holder having a horizontal supporting axis and means for adjustment on said axis whereby the image of the laterally spaced test-object holder is reflected from the said mirror, perpendicular to the line of vision.

14. In an optical appliance including a cabinet having bearing-supports, the combination with a mirror having a shaft and removable journal bearings for the shaft in said supports, a pendent adjusting arm and means for coupling said arm to the shaft, of an arcuate guide plate for the free end of said adjusting arm, co-acting means on the pendent arm and guide plate for retaining the pendent arm, shaft, and mirror in adjusted position, means for adjusting said bearing supports transversely of said shaft, and means for altering the angular relation between said pendent arm and mirror.

15. In an optical appliance, the combination with a cabinet having a horizontally disposed test-object holder, of a mirror centered perpendicularly above the holder, a shaft fixed to the mirror, bearings for the shaft, a pendent adjusting arm rigid with the shaft, a slotted arcuate guide plate, and co-acting clamp means on the free end of the arm and said plate for retaining the arm, shaft and mirror in adjusted position, and means for transverse adjustment of said shaft.

16. An optical appliance including a cabinet having therein a fixed horizontal test-object holder and means for illuminating a test-object on the holder, a vertically spaced reflecting mirror above said holder a shaft fixed to the mirror, bearing supports for the shaft, an adjusting arm coupled with the shaft, means at the free end of said arm for retaining the arm and mirror in adjusted position, and means for transverse adjustment of said shaft.

17. In an optical appliance, a cabinet having therein a fixed horizontal test-object holder and means for illuminating the test-object holder, a vertically spaced reflecting mirror above said holder, said mirror having a horizontal supporting axis and means for adjusting the mirror on its axis, said cabinet having a front opening, a vertically movable panel supported in the walls of a portion of the opening, an observation mirror supported on the panel, and a laterally spaced test-object holder having a horizontal supporting axis and means for adjustment on said axis.

ORVAL W. LEE.